ated Systems", *Nature Physical Science,* vol. 238, 7-10-72, pp. 28, 29.

United States Patent [19]

Maeda

[11] 4,172,108
[45] Oct. 23, 1979

[54] PROCESS FOR PRODUCTION OF SIALONS

[75] Inventor: Takayoshi Maeda, Takatsuki, Japan

[73] Assignee: Sumitomo Chemical Co., Ltd., Osaka, Japan

[21] Appl. No.: 861,193

[22] Filed: Dec. 14, 1977

[30] Foreign Application Priority Data

Dec. 20, 1976 [JP] Japan ................................ 51/153922

[51] Int. Cl.$^2$ ............................................. C04B 35/44
[52] U.S. Cl. ........................................ 264/65; 106/65; 106/73.4; 106/73.5; 264/85; 264/332
[58] Field of Search ................. 106/73.4, 73.5, 65; 264/65, 332, 85

[56] References Cited

U.S. PATENT DOCUMENTS

| 3,960,581 | 6/1976 | Cutler | 106/73.5 |
|---|---|---|---|
| 4,071,371 | 1/1978 | Milberg | 106/73.5 |
| 4,097,294 | 6/1978 | Rice | 106/73.5 |

OTHER PUBLICATIONS

Jack, "Ceramics based on the Si—Al—O—N and Related Systems", *Nature Physical Science,* vol. 238, 7-10-72, pp. 28, 29.

Sugiyama et al., "Low Temperature Deposition of Metal Nitrides by Thermal Decomposition of Organometallic Compounds", J. Electroche. Soc., Nov. 1975, pp. 1545-1549.

*Primary Examiner*—Robert F. White
*Assistant Examiner*—John A. Parrish
*Attorney, Agent, or Firm*—Cushman, Darby & Cushman

[57] ABSTRACT

Sialon, which is one of promising materials in the field of engineering ceramics, is prepared by mixing a silicon nitride precursor such as amino- or imino-silanes and an alumina precursor such as trialkoxy- or triacyloxy-aluminums or polyaluminoxanes to obtain a sialon precursor, and then heating the sialon precursor at a temperature of not lower than 1000° C. either in an ammonium or inert gas atmosphere or under reduced pressures.

5 Claims, No Drawings

PROCESS FOR PRODUCTION OF SIALONS

This invention relates to a process for producing sialons. More particularly, this invention relates to a process for producing sialons, which comprises heating a novel sialon precursor composition comprising a precursor for silicon nitride selected from specific silicon compounds and a precursor for alumina selected from specific aluminum compounds.

Solid solutions of silicon nitride and alumina are generally called as sialon. They are known to have good stability even at a high temperature region, excellent resistance to molten metals as well as high impact strength. Hence, they are one of the promising materials in the field of engineering ceramics such as melt furnace materials or gas-turbine engine parts and their value is expected to be increasingly high in the future. Although there has hitherto been made no practical application of sialon in industries, several methods as set forth below are known for preparation of sialon.

(1) A method in which silicon nitride powders and alumina powders are reacted by heating in an atmosphere of inert gases.

(2) A method in which silicon dioxide powders and aluminum powders are first heated in nitrogen atmosphere to convert into a mixture of silicon nitride and alumina and then the mixture is further heated to carry out the reaction.

(3) A method in which silicon dioxide powders and aluminum nitride powders are reacted by heating in an inert atmosphere.

According to any one of these methods, powder blending is commonly used and therefore both powders are required to be finely divided powders. It will take a long time before grinding into fine powders, whereby there ensues the problem of environmental pollution from grinders. Furthermore, it is also necessary to carry out the reaction at a high temperature in the range from 1700° to 2000° C. in order to produce efficiently a sialon consisting of phases such as $\beta'$-phase or o'-phase which are considered to be useful in commercial application.

An object of the present invention is to provide a process for production of sialon fine powders and sialon bodies having good quality with ease at a relatively low temperature.

According to the present invention, there is provided a process for producing sialon, which comprises mixing a silicon nitride precursor having at least one silicon-nitrogen bond and an alumina precursor having at least one aluminum-oxygen bond in an organic solvent, removing the organic solvent by evaporation to provide a sialon precursor composition, and converting the sialon precursor composition into sialon by heating the sialon precursor composition either in an atmosphere of an ammonia or inert gas or under reduced pressures at a temperature of not lower than 1000° C.

The silicon nitride precursor having at least one silicon-nitrogen bond to be used in the present invention includes substituted or unsubstituted amino- or imino silanes or a mixture thereof which can be synthesized according to well known methods by the reaction between silicon tetrachloride or trichlorosilane and ammonia or primary or secondary amines such as aniline, mono-ethylamine, diethylamine or mono-isopropylamine.

One class of the compounds useful as the alumina precursor having at least one aluminum-oxygen bond to be used in the present invention is polyaluminoxane represented by the formula:

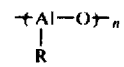

wherein R is an alkyl having 1 to 4 carbon atoms, an alkoxy having 1 to 3 carbon atoms, an acyloxy having 1 to 17 carbon atoms and n is an integer representing polymerization degree of 3 to about 90. Another class of the compounds useful as the alumina precursor having at least one aluminum-oxygen bond to be used in the present invention is at least one trialkoxy- or triacyloxy aluminum of the formula:

wherein $R_1$, $R_2$, $R_3$, which may be identical or different, represent an alkoxy having 1 to 3 carbon atoms such as those mentioned with reference to R or an acyloxy having 1 to 17 carbon atoms such as those mentioned with reference to R. Typical examples of such compounds are tris-isopropoxy aluminum and tris-acetoxy aluminum.

The organic solvent to be used for producing the sialon precursor composition includes ethers such as diethyl ether, aliphatic hydrocarbons such as hexane and heptane and aromatic hydrocarbons such as benzene, toluene and xylene.

The sialon precursor composition is prepared according to the present invention by first mixing homogeneously or inhomogeneously the silicon nitride precursor and the alumina precursor in the organic solvent at an atomic ratio of Si/Al ranging from 2/1 to 6/1 and then removing the solvent by evaporation, whereby powdery or viscous liquid sialon precursor composition is obtained. Impurities having active hydrogens such as water or alcohols which may be contained in the solvent or in the atmosphere employed are desirably removed from the system, because they cause gelation of polyaluminoxane or cleavage of silicon-nitrogen bonds.

The thus prepared sialon precursor composition is heated in an atmosphere of ammonia gas or an inert gas such as nitrogen or argon or under reduced pressures of not higher than 20 mmHg at a temperature of not higher than 1000° C., preferably 1300° to 1800° C. to obtain sialon. When the rate of elevating the temperature for heating the sialon precursor composition is too rapid, carbonaceous materials may be incorporated in the resultant sialon. Therefore, the rate of elevating the temperature is desired to be not faster than 400° C./hour. From standpoint of practical efficiency, it is preferably from 50° to 300° C./hour to obtain favorable results. Accordingly, any type of heating furnace may be available so long as it can control the atmosphere and the rate of temperature elevation.

For the purpose of producing sialon powders, especially fine powders of sialon, the sialon precursor composition is heated in the said atmosphere, preferably in nitrogen atmosphere, or under reduced pressures by elevating the temperature from 450° to 1100° C., preferably from 600° to 1000° C., to convert into a white or grayish white mass, which is amorphous as analyzed by X-ray but very easy of grinding, and then after grinding the mass is further heated preferably in nitrogen gas at 1300° C. to 1800° C. X-ray spectrum of the resultant product shows that it consists only of β'-phase fine powders with the average particle diameter of 1.5μ or less.

For the purpose of producing sialon bodies, the sialon precursor composition may be first heated (calcined) at 450° to 1400° C. in the said atmosphere or under reduced pressures for 1 to 3 hours, followed by grinding into fine powders (size: 0.2 to 3.0μ) of calcined product. This is then compression molded to obtain a green, which is, in turn, heated (fired) preferably in nitrogen gas to 1300° C. to 1800° C. and maintained at said temperature for 1 to 3 hours, whereby good sialon bodies can be obtained. The above calcined powder can also be subjected to hot press preferably in nitrogen gas atmosphere at 1300° C. to 1800° C. to provide sialon bodies with further increased density.

The strength of green prepared by use of the aforesaid calcined sialon precursor is strong enough to cause no problem in handling, with an advantage that it is not necessary to add any additive such as binders.

Furthermore, the sialon precursor composition of the present invention can be used as a binder for preparation of a sialon molded product by using the conventional method, that is, a green, which is prepared by adding about 5% or more of the sialon precursor composition to commercially available silicon nitride powders or mixed powders of silicon nitride and alumina, does not suffer from deformation, as compared with green containing no such additive, and very easy in handling.

The present invention is further illustrated by the following Examples, by which the present invention is not limited. In Examples, % is by weight.

EXAMPLE 1

A: Synthesis of silicon nitride precursor

Into a stirred, ice-cooled 7% solution of silicon tetrachloride in n-hexane is introduced an excess amount of ammonia gas, followed by evaporation of the solvent, to obtain white powders comprising imino silane and ammonium chloride. This mixture is washed with liquid ammonia as solvent for removal of ammonium chloride to give imino silane (A-1). The white powders prepared in the same manner as above is heated at 400° C. in a quartz tube under nitrogen gas stream to remove ammonium chloride by pyrolysis, whereby imino silane (A-2) is obtained. According to the procedure similar to that in synthesis of (A-1), imino silane (A-3) is obtained from the reaction between trichlorosilane and ammonia.

In a stirred, ice-cooled 10% solution of silicon tetrachloride in diethyl ether is added dropwise about 10 times moles as much as isopropylamine to give tetraisopropylamino silane (A-4). The isopropylamine hydrochloride simultaneously formed is separated by filtration.

By X-ray analysis, it is confirmed that α- and β-silicon nitride mixture is formed when the products (A-1) through (A-4) are heated at 1800° C. under nitrogen gas for 30 minutes.

B: Synthesis of alumina precursor

Under atmosphere of nitrogen gas, into 20% dioxane solution of triethyl aluminum is added dropwise an equal amount of water diluted with dioxane. After dropwise addition, the mixture is further matured at about 80° C. for one hour to give a dioxane solution containing polyethyl aluminoxane with polymerization degree of about 50. By evaporation of dioxane under reduced pressure, powders of polyethyl aluminoxane (B-1) are obtained. By dropwise addition of equal amount of isopropanol into the dioxane solution of polyethyl aluminoxane, polyisopropoxy aluminoxane (B-2) is obtained. Commercially available aluminum triisopropoxide (B-3) is also used.

When these compounds (B-1) to (B-3) are heated to 1200° C. under stream of nitrogen gas and maintained at said temperature for one hour, α-alumina is found to be formed, as confirmed by X-ray analysis.

C: Preparation of sialon fine powders

Into a 30% dioxane solution of the polyisopropoxy aluminoxane (B-2) is added (A-2) at a Si/Al ratio of 4/1. After well mixing, dioxane is removed by evaporation to obtain a white powdery sialon precursor. This precursor (10 g) is charged into an alumina tube and heated to elevate the temperature by means of an electric furnace set at the rate of temperature elevation of 200° C./hour, in ammonia stream up to 100° C. and in nitrogen gas stream from 100° C. to 900° C., and maintained at 900° C. for 2 hours. The calcined sialon precursor powders are ground in a mortar for 10 minutes and then heated again at 1400° C. in nitrogen gas to obtain sialon powders. These powders are fine powders with average particle diameter of 1.5μ or less and confirmed by X-ray analysis to consist only of β'-phase sialon.

When sialon precursors obtained from mixtures of any one of the group A and any one of the group B are heated by the same method as described above, sialons are confirmed to be formed.

EXAMPLES 2-11

Various sialon precursor powders are prepared by substantially the same method as described in Example 1 except that the heating temperatures, namely calcination temperatures and the mixing ratios of silicon atoms to aluminum atoms Si/Al are varied as shown in Table 1. Each calcined sialon precursor powder (1 to 2 g) is formed into a disc of 20 mm in diameter and 1 to 3 mm in thickness under pressures of 800 to 2080 kg/cm². These discs are heated (fired) in nitrogen gas atmosphere to raise the temperature in an electric furnace at the rate of 300° C./hour up to 1400° to 1700° C. and held at said temperature for 45 to 60 minutes, whereby sintered products with true specific gravities of 3.0 to 3.2 g/cm³ and bulk specific gravities of 1.4 to 2.4 g/cm³ are obtained. These sintered products are confirmed by X-ray analysis to be β'-phase sialon. The results are set forth in Table 1.

Table 1

| | | Starting powders | | Firing conditions | | Sintered products | | |
|---|---|---|---|---|---|---|---|---|
| | | Si/Al | Calcination temperature (°C.) | Molding pressure (kg/cm$^2$) | Temperature (°C.) | Holding time (min.) | True specific gravity (g/cm$^3$) | Bulk specific gravity (g/cm$^3$) | Impurities other than $\beta'$-sialon |

| | | Si/Al | Calcination temp. (°C.) | Molding pressure (kg/cm$^2$) | Temperature (°C.) | Holding time (min.) | True sp. gr. (g/cm$^3$) | Bulk sp. gr. (g/cm$^3$) | Impurities |
|---|---|---|---|---|---|---|---|---|---|
| Example | 2 | 3/1 | 900 | 2080 | 1600 | 60 | 3.1 | 2.4 | none |
| " | 3 | " | " | 1440 | " | " | " | 1.9 | " |
| " | 4 | " | " | 800 | " | " | " | 1.7 | " |
| " | 5 | " | " | 2080 | 1400 | " | " | 1.2 | traces of unknown impurities |
| " | 6 | " | " | " | 1700 | 45 | " | 2.4 | none |
| " | 7 | " | 1100 | 1440 | " | " | 3.2 | " | " |
| " | 8 | " | 1300 | " | " | " | " | 1.7 | " |
| " | 9 | " | 1400 | " | " | " | " | " | " |
| " | 10 | 6/1 | 900 | " | " | " | 3.0 | 1.4 | " |
| " | 11 | 2/1 | " | " | " | " | 3.2 | 2.4 | trace of —Al$_2$O$_3$ |

EXAMPLE 12

By use of 2.3 g of the same starting powders as in Example 7, disc of 20 mm in diameter is molded previously under pressure 200 kg/cm$^2$. This disc is placed in a mold made of graphite and subjected to hot press in nitrogen atmosphere at 1700° C. under a pressure of 350 kg/cm$^2$ for 20 minutes to give a sintered product of $\beta'$-sialon having 3.0 g/cm$^3$ of apparent specific gravity.

EXAMPLE 13

To 20 parts of a 10% dioxane solution of sialon precursor prepared by mixing a dioxane solution of tetraisopropylamino silane (A-4) and a dioxane solution of polyisopropoxy aluminoxane (B-2) at Si/Al ratio of 3/1 are added 12 parts of the same starting powders as in Example 9 to prepare a mixture. Then, the solvent is evaporated and, using one gram of the resultant powders, disc is molded under a pressure of 2080 kg/cm$^2$. The disc is heated (fired) under the same firing conditions as in Example 6 to obtain $\beta'$-sialon sintered product with apparent specific gravity of 2.5 g/cm$^3$.

EXAMPLE 14

One part of the same precursor powders before calcination as in Example 11 is well mixed in a mortar with 10 parts of commercially available silicon nitride powders comprising a mixture of $\alpha$-type and $\beta$-type. The mixture is molded under a pressure of 2080 kg/cm$^2$ into a disc and the disc is heated (fired) in an electric furnace set at the rate of temperature elevation of 300° C./hour to elevate the temperature up to 1750° C., at which the disc is held for one hour to give $\beta'$-sialon sintered product.

What is claimed is:

1. A process for producing sialon, which comprises, mixing a silicon nitride precursor having at least one silicon-nitrogen bond and which is at least one substituted or unsubstituted amino or imino silane and an alumina precursor having at least one aluminum-oxygen bond, is at least one member selected from the group consisting of trailkoxyaluminums, triacyloxyaluminums and polyaluminoxanes in an organic solvent, removing the organic solvent by evaporation to provide a sialon precursor composition, and effecting conversion of the sialon precursor composition into sialon by heating the sialon precursor composition at a temperature of not lower than 1000° C. at a rate of elevating the temperature of at most 400° C. per hour either in an atmosphere of an ammonia or inert gas under reduced pressures.

2. A process according to claim 1, wherein the organic solvent is a member selected from ethers, aliphatic hydrocarbons and aromatic hydrocarbons.

3. A process according to claim 1, wherein the conversion is effected by heating the sialon precursor composition at a temperature of 450° C. to 1100° C. in an atmosphere of an ammonia or inert gas or under reduced pressures to obtain a heat-treated product, grinding the heat-treated product and then heating the resulting powder in an atmosphere of an ammonia or inert gas at a temperature of not lower than 1300° C. to obtain a $\beta'$-phase sialon fine powder.

4. A process according to claim 1, wherein the conversion is effected by calcining the sialon precursor composition at a temperature of 450° to 1400° C. either in an atmosphere of an ammonia or inert gas or under reduced pressures, grinding the calcined product, molding the resulting powder to obtain a green, and then firing the green in an atmosphere of an inert gas at a temperature of not lower than 1300° C. to obtain a sialon article molded.

5. A process according to claim 4, wherein the molding is carried out by compression molding or hot-press molding.

* * * * *